United States Patent [19]

Meurer

[11] Patent Number: 4,507,994
[45] Date of Patent: Apr. 2, 1985

[54] DEVICE FOR MONITORING A CYLINDER-PISTON ASSEMBLY

[75] Inventor: Wolfgang Meurer, Buderich, Fed. Rep. of Germany

[73] Assignee: Jagenberg AG, Dusseldorf, Fed. Rep. of Germany

[21] Appl. No.: 492,770

[22] Filed: May 9, 1983

Related U.S. Application Data

[63] Continuation-in-part of Ser. No. 164,447, Jun. 30, 1980, abandoned, which is a continuation of Ser. No. 029,164, Apr. 11, 1979, abandoned.

[30] Foreign Application Priority Data

Sep. 10, 1978 [DE] Fed. Rep. of Germany ....... 2815489

[51] Int. Cl.³ ............................ B26D 1/62; B26D 7/24
[52] U.S. Cl. ........................................... 83/58; 83/324; 83/345; 83/399; 83/571
[58] Field of Search ................... 83/58, 62, 62.1, 399, 83/400, 571, 324, 345; 73/141 AB, 143; 116/DIG. 34; 340/665, 666, 668

[56] References Cited

U.S. PATENT DOCUMENTS

| | | | |
|---|---|---|---|
| 3,033,495 | 5/1962 | Sikora | 73/141 AB X |
| 3,745,865 | 7/1973 | Johnson | 83/324 X |
| 3,798,631 | 3/1974 | Langford | 340/668 X |
| 3,918,301 | 11/1975 | Baer | 340/668 X |

FOREIGN PATENT DOCUMENTS 1573960 11/1970 Fed. Rep. of Germany ........ 73/143

Primary Examiner—Frank T. Yost
Attorney, Agent, or Firm—Sprung, Horn, Kramer & Woods

[57] ABSTRACT

A device for monitoring the tractive force generated by a cylinder-piston assembly on a member to be moved thereby comprises a spring mounted between the cylinder assembly and the member to be moved such that the force generated by the cylinder-piston assembly is transmitted to the spring to effect movement of a first portion thereof with respect to a second portion thereof. An actuatable switch comprises the first switching element mounted for movement with the first portion of the spring and a second switching element fixedly mounted to the second portion of the spring, the two switching elements configured to actuate the switch when a predetermined path of travel of the first portion of the spring is exceeded.

7 Claims, 5 Drawing Figures

[4,507,994]

DEVICE FOR MONITORING A CYLINDER-PISTON ASSEMBLY

CROSS-REFERENCES TO RELATED APPLICATIONS

This application is a continuation-in-part of patent application Ser. No. 164,447, filed June 30, 1980, now abandoned, which was in turn a continuation of application of patent application Ser. No. 029,164, filed Apr. 11, 1979, now abandoned.

BACKGROUND OF THE INVENTION

The invention relates to a device for monitoring a cylinder-piston assembly, and particularly a tractive force to be generated by the assembly, comprising a switch responsive to the action of the assembly.

For the cutting of a web of material, such as paperboard, into individual sections, it is known to use a crosscutter whose two blade drums are driven with periodically changing angular velocities through a linkage to produce, depending on their settings, sections of material of different lengths. For variation of the angular velocity of the blade drums, the linkage has a double crank drive with a two-armed lever (double lever) whose pivot is adapted to be shifted transversely for adjustment of the rate of change of the angular velocity. To this end, the pivot of the two-armed lever is supported in a slide, which after having been positioned in accordance with the desired length of the material section, is clamped in place. Such clamping requires a clamping force of from 30 to 40 tons.

To produce this force, it is known to clamp the slide between two eccentrics, each of which is integral with a lever. Disposed between the free ends of the two levers is a cylinder-piston assembly which exerts a tractive force which pulls the lever ends toward each other, thus producing the requisite clamping force. An insufficient clamping force must be precluded with a high degree of reliability, as otherwise the slide will be displaced by the action of the driving forces, with the linkage then reaching extreme positions. With the rate of change of the angular velocity set at a low value and the rotative speed set at the maximum permissible value, the result would be that at constant rotative speed and the now substantially increased rate of change of the angular velocity, the linkage would be destroyed.

Heretofore it was sought to provide for sufficient clamping force by causing the cylinder stroke to actuate a switch so that the machine could not be operated when the cylinder stroke was too short. With this arrangement, it could happen, especially after the crosscutter had been in operation for an extended period, that as a result of the cumulative play between the various machine parts, the piston stroke would be sufficient for actuation of the switch and yet an adequate clamping force could not be produced.

SUMMARY OF THE INVENTION

It is the object of the invention to provide a device of the type mentioned above which will, with a high degree of reliability, generate a signal or prevent the machine from being operated when an insufficient force is produced.

In accordance with the invention, this object is accomplished by providing, between the cylinder-piston assembly and the device to be operated, a spring transmitting the force generated, a switch disposed at one end of the spring and at its other end a part which actuates the switch when a predetermined path of the spring is exceeded.

The device in accordance with the invention does not use the path of displacement of the cylinder-piston assembly to monitor the assembly, rather it measures the generated tractive force directly and produces a signal or actuates a switch when a predetermined tractive force is exceeded. This provides a high degree of assurance that the requisite clamping force will be generated before the machine starts running. The selected spring strength provides a simple means for determining the exact clamping force at which the machine is to start operating.

The spring is preferably a compression spring. Moreover, it is proposed that the spring be disposed between two disks, with a rod fixed to the first disk and passing through the spring and the second disk. The part to be actuated may then be mounted on the rod at the end passing through the second disk, and the cylinder-piston assembly can be mounted on a third disk adjacent the first disk.

A compact and closed arrangement is achieved when there is mounted on the second disk, a cylinder which coaxially surrounds the spring. The cylinder is mounted with one end facing the second disk and the other end facing the third disk, whose inner surface abuts the first disk when the spring is not loaded. Preferably a push-button switch is mounted on the second disk, and with a member mounted on the first disk for actuating the switch.

DETAILED DESCRIPTION OF THE INVENTION

Figure 1:
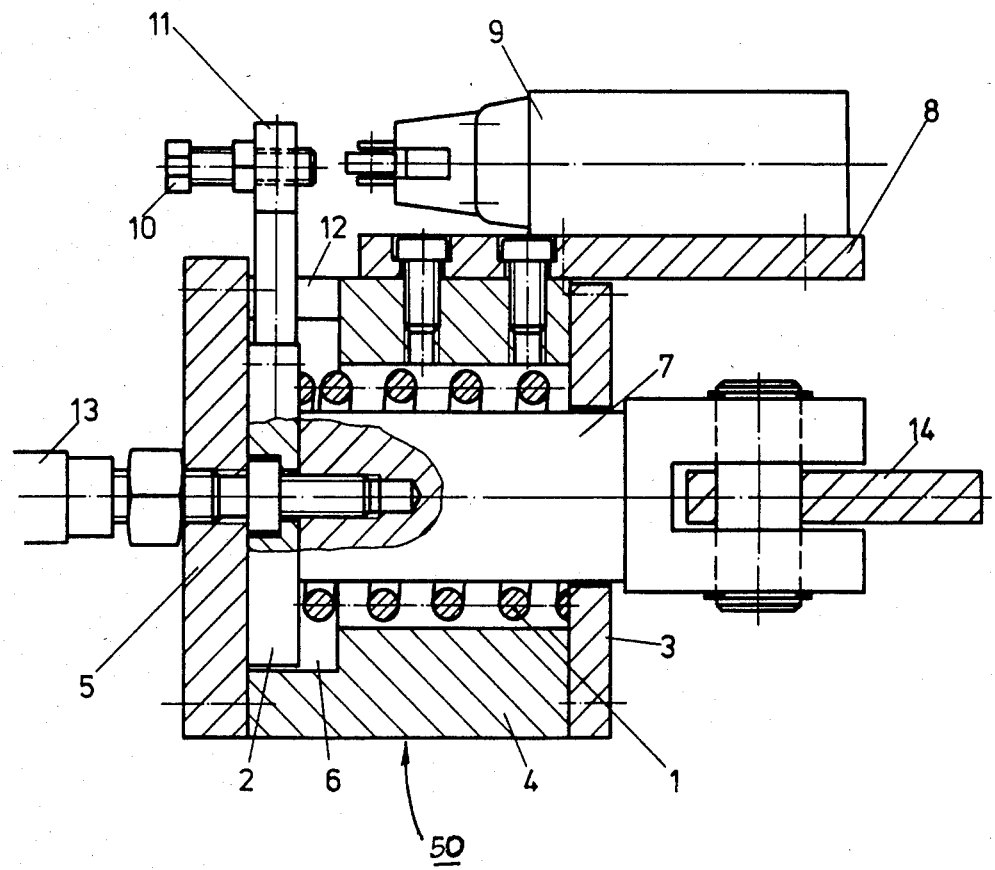
FIG. 1 is an elevational view shown in partial cross-section of an apparatus according to the present invention for monitoring a cylinder-piston assembly.

In FIG. 1, a device 50 for monitoring a cylinder-piston assembly is shown wherein a compression spring 1 is disposed between a first circular disk 2 and a second circular disk 3 which is movable relative to the first disk 2. The second disk 3, which is parallel to the first disk 2, closes off the front end of a cylindrical pipe section or cylinder 4 which surrounds the spring 1 and whose other end is closed off by a third circular disk 5. The cylinder 4 is provided with an internal coaxial annular groove 6 into which the first disk 2 is set. The annular groove 6 is about twice as wide as the first disk 2 is thick, so that the first disk 2 is displaceable in the annular groove 6. Fixed coaxially to the first disk 2 is a round steel rod 7 whose radius is only sightly smaller than the inside radius of the spring 1 and which extends through the spring 1 and through a central bore in the second disk 3 to project from the cylinder 4.

Fixed at the right angle to the cylinder 4 is a plate 8 which carried a pushbutton switch or electrical limit switch 9. The switch 9 is actuatable by an adjustable screw 10 seated in the free end of a bar 11. The bar 11 is fixed to the circumference of the first disk 2 and extends radially from the cylinder wall of cylinder 4 and has the width of the annular groove 6. The bar 11 is adjacent to member 12.

The device is coaxially mounted, by the third disk 5, on the piston rod 13 of a cylinder-piston assembly (not shown in FIG. 1). The cylinder (not shown in FIG. 1) of the cylinder-piston assembly is pivotally connected to the free end of a first lever (not shown in FIG. 1), and the rod 7 is pivotally connected to the free end 14 of a second lever (not shown in FIG. 1). The first and second levers are fixed to two eccentrics (not shown in FIG. 1) which exert a clamping force on a slide (not shown in FIG. 1) of a linkage of a crosscutter (not shown in FIG. 1) when the ends of the first and second levers are pulled toward each other by the cylinder-piston assembly. As soon as sufficient tractive force, and hence a sufficiently high clamping force, has been developed, the spring 1 is compressed, with the result that the disk 2 moves toward the disk 3. This results in the screw 10 moving toward the pushbutton switch 9 and actuating it. The crosscutter cannot be operated until the switch has been actuated.

Figure 2:
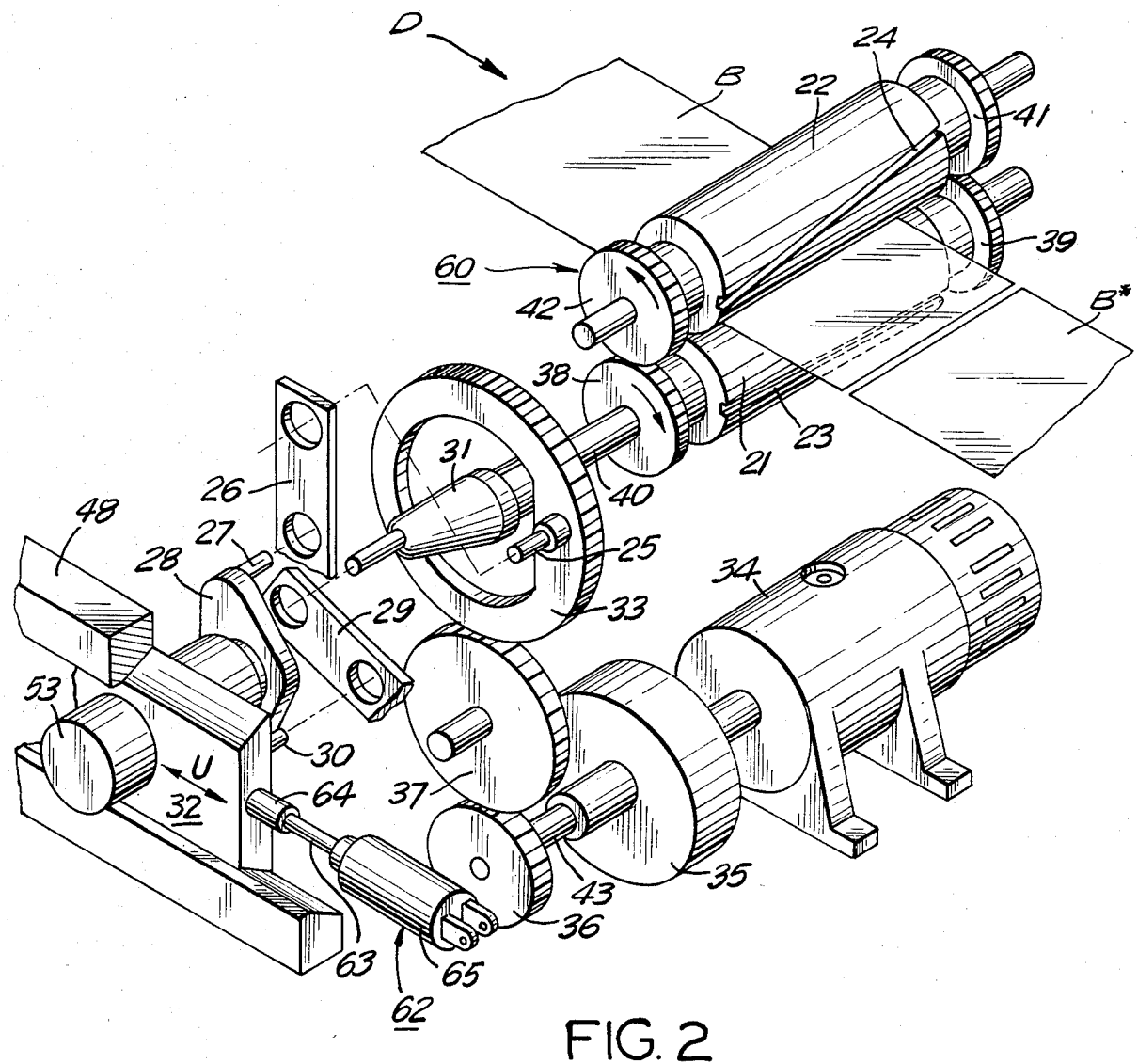
FIG. 2 is an exploded perspective view of a web crosscutter apparatus.

In FIG. 2 is shown a web crosscutter apparatus 60, wherein an endless web B which moves at a uniform velocity in the direction of arrow D, and is cut by two knife drums 21 and 22 which bear transverse knives 23 and 24. The web B is cut into individual sheets B* which are of equal length.

Since it is well known to those skilled in the art that a web crosscutter apparatus 60 must have the ability to cut short or long sheets, a certain amount of control is necessary in the apparatus. If short sheets are to be cut, the drums 21 and 22 must rotate faster per unit time (more cuts per unit time) if the speed of movement of the web B remains unchanged. In order to cut long sheets, the drums 21 and 22 must rotate correspondingly slower per unit time.

To achieve a clean cut and especially to prevent the web B from tearing during the cut, the cutting edges of knives 23 and 24 must be maintained at the same velocity as the web B at the moment the cut is made. This means, that during each revolution, the drums 21 and 22 are accelerated and then retarded and then accelerated again in order to achieve this condition, that is, synchronism during the cut. There is only one special case when no accelerations and retardations of the knife drums 21 and 22 occur and that is only when the sheet length is as great as the circumference of a circle defined by the cutting edges during a rotation of drums 21 and 22.

Figure 3:
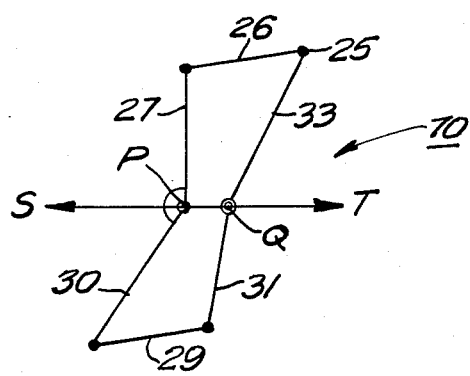
FIG. 3 is a schematic representation of the transmission of the apparatus shown in FIG. 2.

This periodic and unequal movement of the knife drums 21 and 22 is produced by the transmission 70 illustrated in FIG. 2 and which is represented schematically in FIG. 3. With reference to FIG. 3, the linkage point 25 is carried through the axis Q at uniform velocity; the coupling rod 26 is journaled at linkage point 25 and again to the lever arm 27 of the two-armed lever 28 and an additional coupling rod 29 is journaled to the lever arm 30 of two-armed lever 28 and to lever 31. Lever 31 is corotational with the shaft of drum 21. The pivot point P of lever 28 is fastened to a slide 32 via coupling rod 53 and the slide 32 is displaceable in both directions as noted by arrows S and T. The slide 32 is longitudinally held in place by clamping piece 48 at the top of slide 32 and stationary guide rail 49 at the bottom of slide 32.

The slide 32 is moved in the transverse direction back and forth, as indicated by arrow U by means of cylinder-piston assembly 62. Cylinder-piston assembly 62 comprises coupling rod 64 which connects piston 63 to slide 32. Piston 63 is motivated by cylinder 65.

The degree of irregularity of the movement of the drums 21 and 22 depends upon how far point P is away from point Q. All of the transmission 70 parts 33, 26, 27, 30, 29 and 31 are dimensioned such that, with every position of point P in relation to point Q, are arc length can be associated such that at the instant of the cut, synchronization prevails between the knives 23 and 24 an the web B. In other words, the sheet length is adjusted by the displacement of the slide 32.

A motor 34 with uniform drive is connected to fly wheel 35 which is connected to drive gear 36 by shaft 43. Drive gear 37 interposed between drive gear 36 and freely rotating gear 33 (not fixed to the shaft supported drum 21) on which the pivot point 25 is provided.

At each end of drum 21 are rotatable gears 38 and 39. Shaft 40 is connected to gear 38. At each end of drum 22 are rotatable gears 41 and 42.

As is well known to those skilled in the art, when drums 21 and 22 are accelerated or retarded during one revolution, the mass forces that result can be very great. If the slide 32 is not sufficiently secured, i.e., tightly clamped, in the position for that particular moment, an explosive destruction of the transmission 70 can be produced with the concomitant danger to human life.

It is for these reasons that it is extremely important to maintain a check on the force with which the slide 32 is held in its position of the moment.

Figure 5:
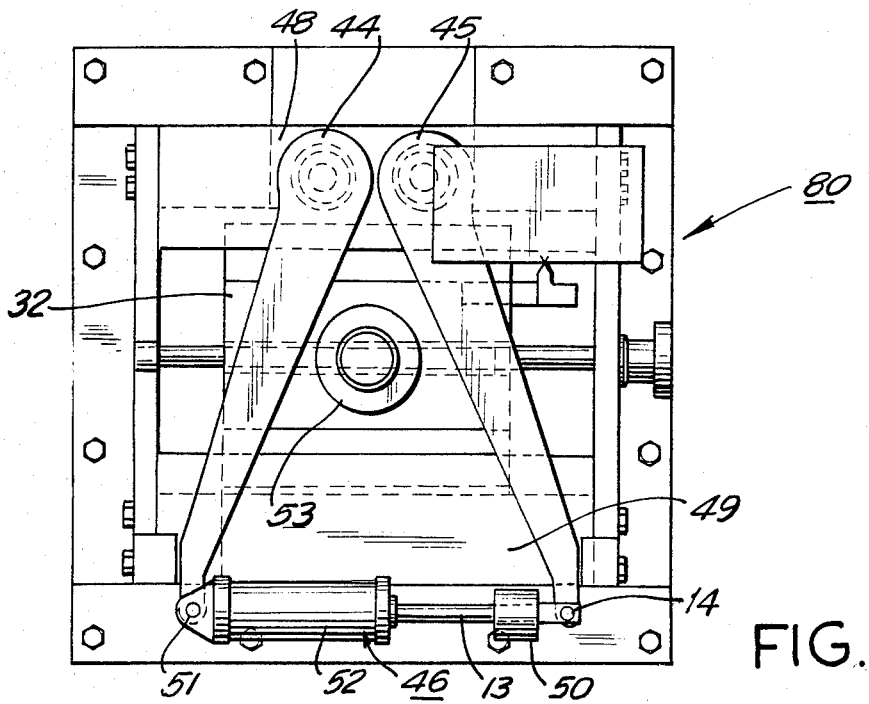
FIG. 5 is a side elevational view taken along the line V—V of FIG. 4.
Figure 4:
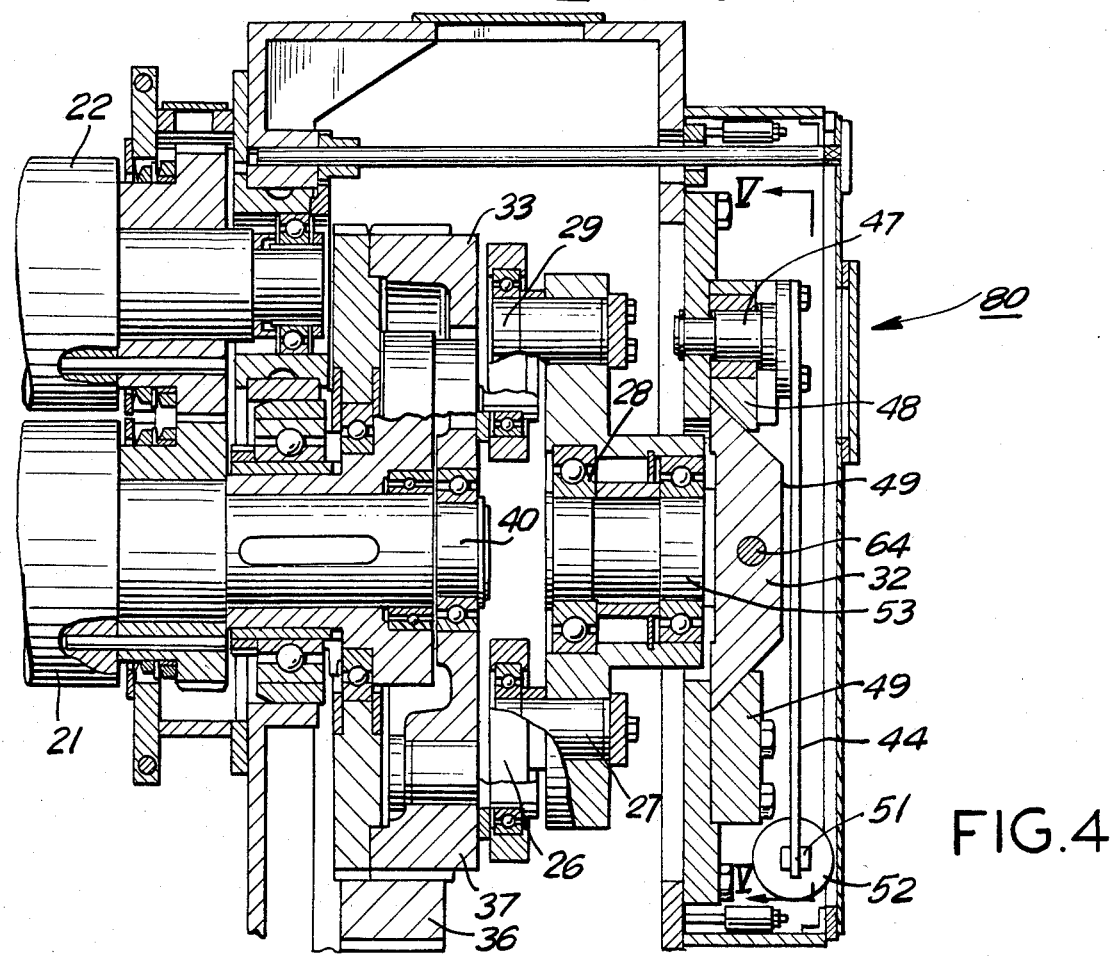
FIG. 4 is an elevational view in partial cross-section depicting a slide clamping mechanism apparatus in which the present invention for monitoring a cylinder-piston assembly is employed.

FIGS. 4 and 5 show a mechanism 80 which affects clamping of the slide 32. In FIG. 5, a first lever 44 and a second lever 45 bear the cylinder piston assembly 46 at their respective ends 51 and 14. The first lever 44 and second lever 45 are adjacent to clamping piece 48. Accordingly, the free end 51 of the first lever 44 is attached to the piston 52 of the cylinder-piston assembly 46. Piston rod 13 of the cylinder-piston assembly 46 is connected to the monitoring device 50. The free end 14 of the second lever 45 is attached to the other end of the monitoring device 50. When hydraulic fluid is fed to the cylinder-piston assembly 46, the free ends 51 and 14 respectively of first lever 44 and second lever 45 are drawn toward one another and then, as can be seen from FIG. 4, the eccentrics 47 (one of two eccentrics shown in FIG. 4) acts on the clamping piece 48 to grip the slide 32 tightly against the stationary guide rail 49. The device 50 for monitoring the cylinder-piston assembly 46 as shown in FIG. 5, is not shown in FIG. 4.

It will be appreciated that the instant specification and examples are set forth by way of illustration and not limitation and that various modifications and changes may be made without departing from the spirit and scope of the present invention.

What is claimed is:

1. In a web crosscutter having two blade drums, means for linking the two drums for adjusting the angular velocity thereof including a positionable slide and means for clamping the slide in a selected position including levers, a cylinder piston assembly for exerting the requisite clamping force on the levers, the improvement comprising means for monitoring the clamping force generated by the cylinder-piston assembly comprising spring means mounted between the cylinder-piston assembly and the levers to transmit the force generated by the cylinder-piston assembly to effect movement of a first portion thereof with respect to a second portion and actuatable switching means comprising a first switching element mounted for movement with said first portion of the spring means and a second switching element fixedly mounted to the second portion of the spring means, the two switching elements configured to actuate the switching means when a predetermined path of travel of the first portion of the spring means is exceeded to effect a stopping of the drive of the crosscutter blade drums.

2. The web crosscutter according to claim 1, wherein the spring means comprises a compression spring.

3. The web crosscutter according to claim 1, wherein the spring means comprises first and second disks, a spring disposed between the two disks, a rod which passes through the spring and a second disk and fixed to the first disk.

4. The web crosscutter according to claim 3, wherein the spring means further comprises a hollow cylindrical member having one end mounted on the second disk and which coaxially surrounds the spring and is configured to slidably receive the first disk at the other end thereof and a third disk fixed to the other end of the cylindrical member and abutting the first disk when the spring is not loaded.

5. The web crosscutter according to claim 4, wherein one lever is connected to the rod and the cylinder-piston assembly is connectable to the third disk.

6. The web crosscutter according to claim 3, wherein the second switching element comprises a pushbutton switch mounted on the second disk and the first switching element comprises an actuating member mounted on the first disk.

7. The web crosscutter according to claim 6, wherein the first switching element comprises a bar connected to the first disk and the actuating member comprises a longitudinally adjustable screw engaged in the bar in longitudinal alignment with the pushbutton switch and movable with the first disk in response to movement of the rod.

* * * * *